United States Patent
Lobo et al.

[11] Patent Number: 5,960,043
[45] Date of Patent: Sep. 28, 1999

[54] SIGNAL RECEIVER

[75] Inventors: Natividade Albert Lobo, Berkshire; Peter Eric Quarmby, Surrey, both of United Kingdom

[73] Assignee: Nokia Mobile Phones Limited, Salo, Finland

[21] Appl. No.: 08/754,220

[22] Filed: Nov. 20, 1996

[30] Foreign Application Priority Data

Nov. 24, 1995 [GB] United Kingdom .................... 9524094

[51] Int. Cl.⁶ ..................................................... H03K 9/00
[52] U.S. Cl. ............................. 375/316; 455/63; 375/350
[58] Field of Search ...................................... 375/247, 285, 375/333, 316, 350; 330/306; 455/88, 561, 63; 475/350

[56] References Cited

U.S. PATENT DOCUMENTS

| | | | |
|---|---|---|---|
| 3,924,068 | 12/1975 | Fletcher et al. | 375/333 |
| 4,652,835 | 3/1987 | Temer | 330/306 |
| 4,713,627 | 12/1987 | Addis | 330/306 |
| 4,860,317 | 8/1989 | Tomlinson | 375/285 |
| 5,440,264 | 8/1995 | Sevenhans et al. | 327/553 |
| 5,603,087 | 2/1997 | Shultz | 455/52.3 |
| 5,708,376 | 1/1998 | Ikeda | 327/50 |

OTHER PUBLICATIONS

Oppenhem & S. Willsky "Signal & System" Prentice–Hall Inc. pp. 411–413, 1983.

*Primary Examiner*—Stephen Chin
*Assistant Examiner*—Mohammad Ghayour
*Attorney, Agent, or Firm*—Perman & Green, LLP

[57] ABSTRACT

A signal receiver which processes a pulse modulated signal comprises a filter which has a greater gain at half the pulse frequency of the pulse modulated signal than at a lower frequency. This helps to reduce intersymbol interference by enhancing components of the input signal that have pulses of alternating sign.

9 Claims, 4 Drawing Sheets

SIGNAL RECEIVER

BACKGROUND OF THE INVENTION

This invention relates to a signal receiver, especially a receiver for pulse modulated signals. Pulse modulated signals are signals in which parameter of a pulse train is varied in accordance with data.

In many conventional signal receivers a received signal is demodulated to extract a pulse modulated signal. The pulses of the pulse modulated signal represent symbols by means of which the message data are encoded. These symbols have to be decoded to determine the underlying message data. In the section of the receiver that processes the pulse modulated signal there is a postdetection filter for filtering the pulse modulated signal that is input to that section, for example to remove high frequency noise, and a decoder for decoding the signal that is output from the filter. The signal input to the postdetection filter has typically suffered already from degradation. This arises from noise, co-channel interference, intersymbol interference (ISI) and distortion from components earlier in the receiver circuit. Therefore, postdetection filters are normally selected to minimise any further degradation. The postdetection filter is usually chosen to be a Bessel filter or a Butterworth filter because these have a generally linear phase response, which leads to little distortion of the pulses in the signal output from the filter, and frequency responses of increasing loss at increasing frequency, which is felt to remove as much noise as possible. FIG. 1 illustrates at 1 the frequency response of a typical Bessel filter. FIG. 2 illustrates at 2 the phase response of a typical Bessel filter as a plot of relative group delay against frequency. Because the pulse modulated signal is degraded, techniques such as DFE (decision feedback equalisation) and Viterbi decoding are used in the decoder to increase the likelihood of correctly decoding the signal output from the postdetection filter.

SUMMARY OF THE INVENTION

According to the present invention there is provided a signal receiver comprising a filter for receiving a pulse modulated signal and filtering it to generate a second signal, the filter having a greater gain at half the pulse frequency of the pulse modulated signal than at a lower frequency.

The lower frequency is suitably, for example, zero (DC) or a quarter or a sixth of the pulse frequency. Preferably the filter has a substantially greater gain at half the pulse frequency than at the lower frequency. Preferably the filter's gain is 1 to 5 dB greater at half the pulse frequency than at the lower frequency, more preferably 1.5 to 2.5 dB greater, most preferably around 2 dB greater. Preferably the filter has a greater gain at half the pulse frequency than at any frequency lower than that. Preferably the gain of the filter peaks around, most preferably at or substantially at, half the pulse frequency. The gain of the filter preferably peaks at between 0.25 and 0.75 times the pulse frequency, more preferably within 25% of half the pulse frequency, most preferably within 10% of half the pulse frequency. Preferably the filter has an absolute gain at half the pulse frequency.

One effect of the filter, and especially its gain characteristics, is suitably to mitigate the effect of ISI in the pulse modulated signal, suitably by enhancing in the second signal components of the pulse modulated signal at half the pulse frequency relative to components at the lower frequency.

The receiver suitably comprises a demodulating means for demodulating a received signal to produce the pulse modulated signal. The filter is suitably arranged to receive that pulse modulated signal. The receiver suitably comprises a decoder for decoding a signal dependant on the second signal, most preferably for decoding the second signal itself. The decoder suitably decodes the signal by sampling it at at least the pulse frequency, preferably at the pulse frequency. The decoder preferably receives the second signal directly from the filter. Alternatively there may be some processing of the signal between the filter and the decoder.

The filter is suitably in the baseband section of the receiver. It is suitably a postdetection filter, suitably in a radio signal receiver of a radio telephone.

BRIEF DESCRIPTION OF THE DRAWINGS

The present invention will now be described by way of example and with reference to the accompanying drawings in which:

FIG. 6 illustrates the frequency response of a filter; and

DESCRIPTION OF THE PREFERRED EMBODIMENT

Figure 3:
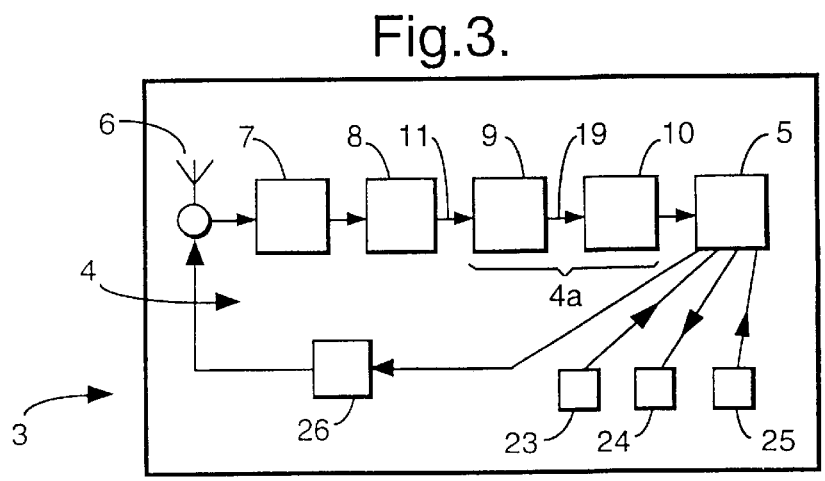
FIG. 3 is a schematic diagram of a radio telephone.
Figure 4:
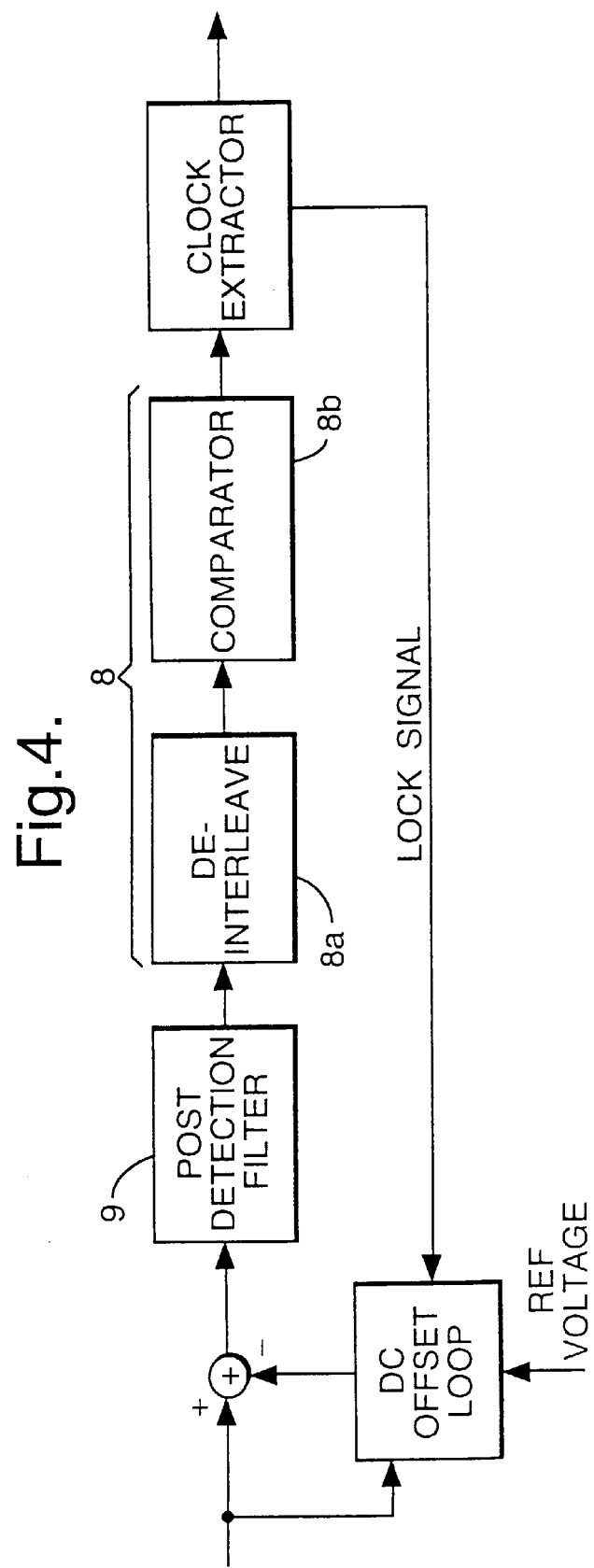
FIG. 4 is a schematic diagram of the analogue to digital conversion circuit of the receiver section of the telephone.

Referring to FIG. 3 the radio telephone 3 has a receiving section 4 which receives signals and decodes them for processing by processor (μP) 5. The receiving section comprises an antenna 6, a bandpass filter (BDF) 7 (for example a SAW (surface acoustic wave) filter), a demodulator (DEMOD) 8 and a baseband section 4a comprising a postdetection filter 9 and a decoder 10. As is usual, the telephone comprises a microphone 23, a speaker (SPKR) 24 a keypad 25 and a transmit section 26 to allow telephone calls to be made. FIG. 4 shows in more detail that the analogue to digital conversion circuit of the telephone comprises a DC offset circuit; the postdetection filter 9; a deinterleaving circuit 10a and a comparator 10b in the decoder 10; and a clock extractor which generates a lock signal.

The radio telephone is a DECT (digital European cordless technology) handset. DECT is a TDMA (time division multiple access) system using a GFSK (Gaussian frequency shift keying) modulation scheme with BT=0.5. After demodulation the signal received by baseband section 4a is a PCM (pulse code modulated) signal. The PCM signal is a pulse modulated signal made up of regular pulses at a frequency of 1.152 MHz. The amplitude of each pulse is dependant on the symbol it represents and on the degradation the signal has suffered, including degradation due to ISI.

Figure 5:
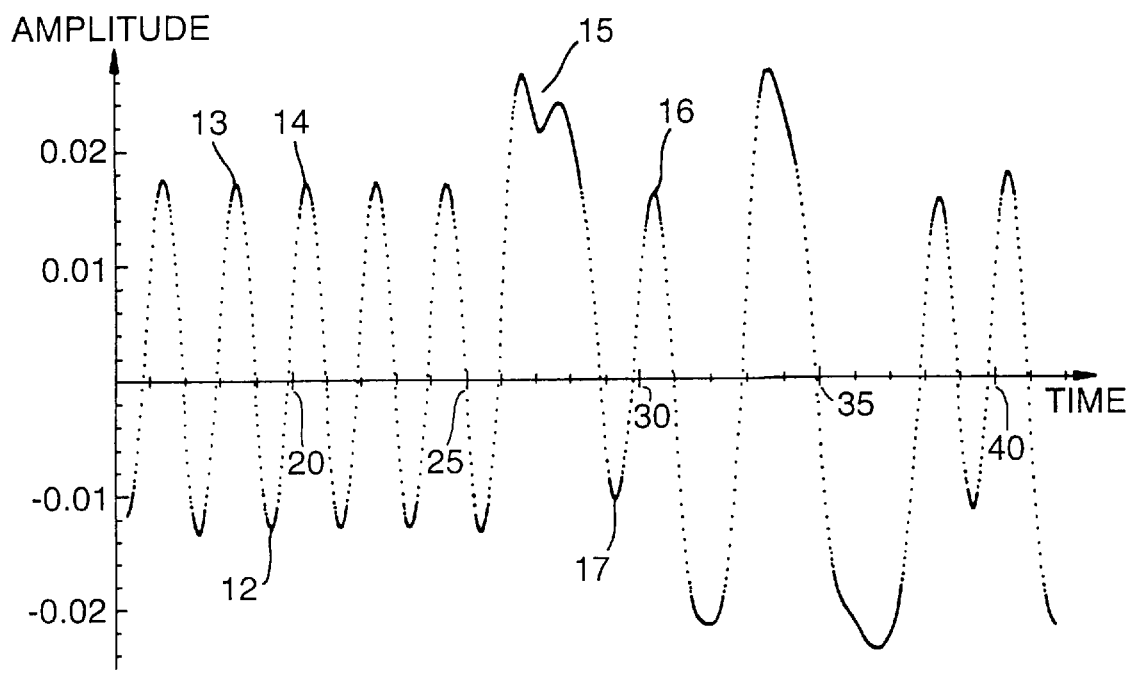
FIGS. 5 and 8 illustrate pulse modulated signals.

FIG. 5 illustrates a typical PCM signal at the input 11 to the postdetection filter. The signal is a pulse code modulated signal using a binary code with positive (+1) and negative (−1) pulses. Each pulse represents a symbol. Because the support of each pulse exceeds the bit period of the signal each pulse is affected by ISI from adjacent pulses. For instance, in FIG. 5 destructive interference from adjacent +1 pulses 13 and 14 has reduced the amplitude of −1 pulse 12. At 15 three adjacent +1 pulses have interfered constructively to cause increased amplitude. This increased amplitude together with +1 pulse 16 has reduced greatly, by destructive interference, the amplitude of −1 pulse 17. Pulses of reduced amplitude are at particular risk of being decoded wrongly by decoder 10. For example, noise may easily swamp a low amplitude pulse.

A decrease in amplitude due to destructive interference is especially likely to occur where the signs of adjacent pulses alternate (for example in a +1, −1, +1 sequence in a binary coded signal). Because they alternate in sign at the pulse frequency these sections of the input signal have a relatively strong component at half the pulse frequency. This is clear from the left-most portion of FIG. 5. An increase in amplitude due to constructive interference is especially likely to occur where adjacent pulses have the same sign. These sections of the input signal have a relatively strong component at lower frequencies—for example DC, or a quarter or a sixth of the pulse frequency.

Figure 1:
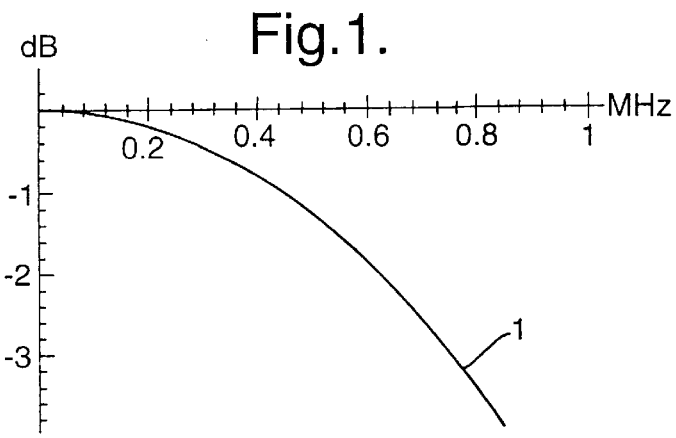
FIGS. 1 and 6 show filters' frequency responses.
Figure 6:
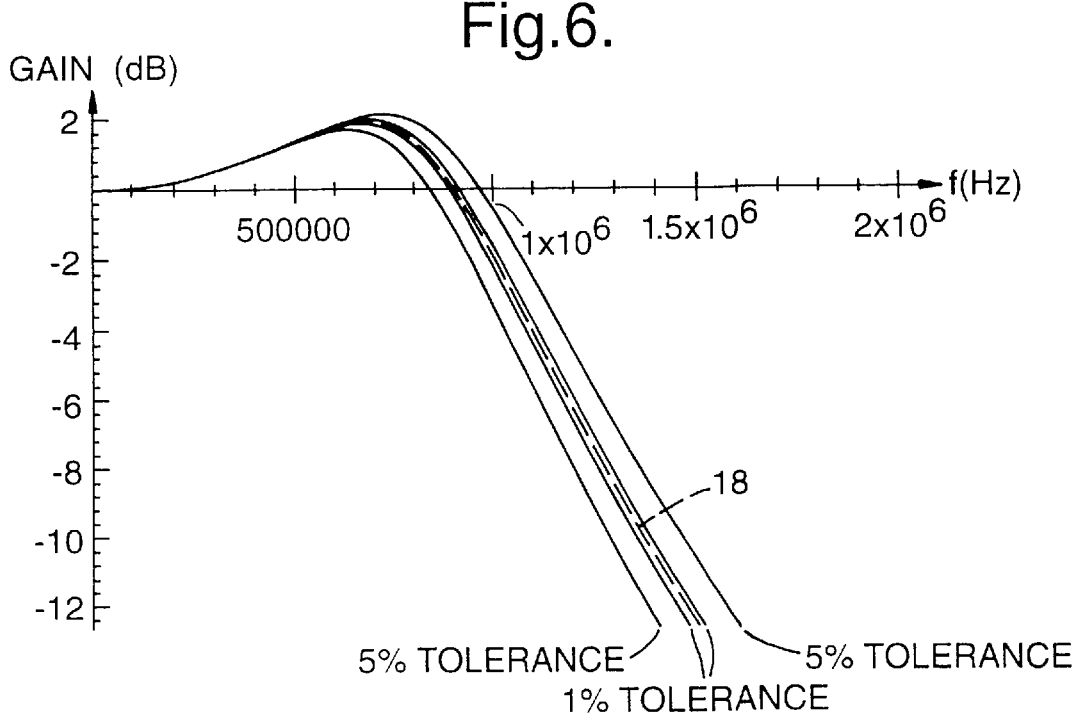

FIG. 6 illustrates at 18 the frequency response of filter 9 according to the example of the present invention. In contrast to the frequency response 1 of the Bessel filter (see FIG. 1) the frequency response of the filter 9 peaks at around half the pulse frequency of the pulse modulated signal at 11 received by the filter 9. Above that peak the gain of the filter falls, to filter high frequency noise from the signal. Below the peak the gain also falls, initially at an increasing rate and then at a decreasing rate as it approaches zero frequency. The gain at zero frequency is approximately zero. The effect of this is that in the second signal (at 19) output from the filter the components of the signal at 11 at half the pulse frequency are enhanced relative to components of lower frequencies. The effect of this is to enhance parts of the signal at 11 that contain pulses of alternating sign relative to parts of the signal at 11 that contain consecutive pulses of the same sign. As a result the filter mitigates the effect of ISI. In the present example, the filter 9 has an absolute gain at half the pulse frequency, but this is not essential. It is preferred for the gain of the filter to peak within 20%, 10% or 5% of half the pulse frequency. The filter is not restricted to binary coded signals—it may benefit pulse modulated signals that have more than two possible symbols.

Figure 2:
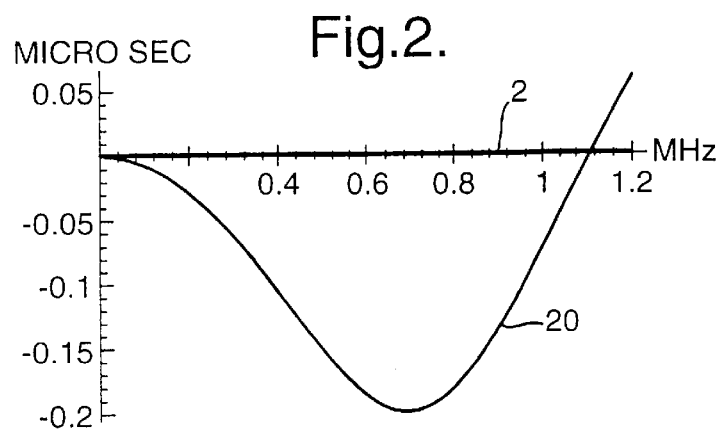
FIG. 2 shows filters' relative group delays.

At 20 FIG. 2 illustrates the relative group delay of filter 9. This characteristic is not as linear as that of the Bessel filter. One way to reduce any non-linearity in group delay is by using a delay equaliser.

Figure 7:
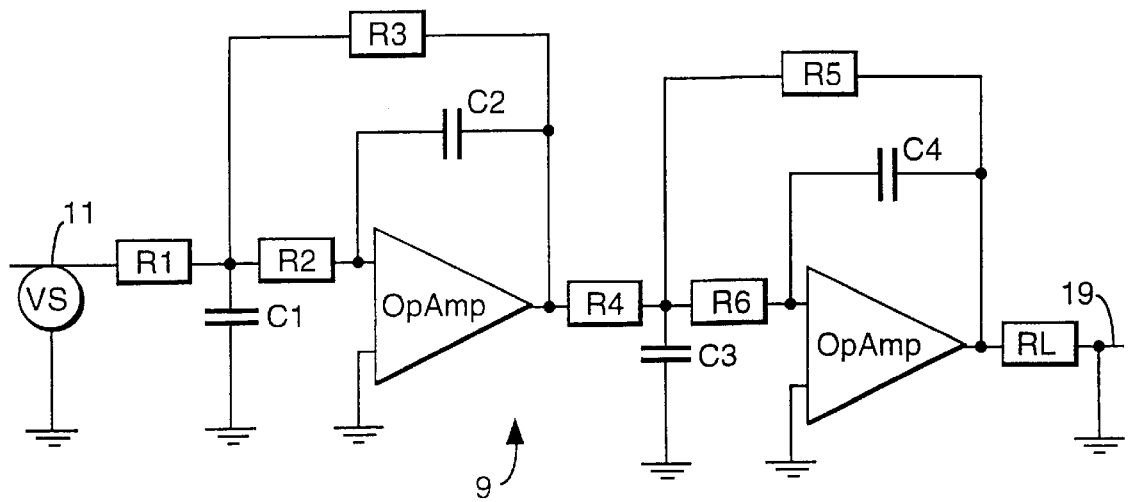
FIG. 7 is a circuit diagram of a filter.

FIG. 7 shows the filter 9 in more detail. The values of the components in the filter are as follows: R1=6.2 kΩ, R2=3.3 kΩ, R2=6.2 kΩ, R4=12.0 kΩ, R5=12.0 kΩ, R6=6.2 kΩ, RL=50Ω, C1=33.0 pF, C2=15.0 pF, C3=82.0 pF.

An alternative design of filter which could be used is a biquad circuit. The quality factor Q of such a filter would suitably be from around 1 to around 1.5.

Figure 8:
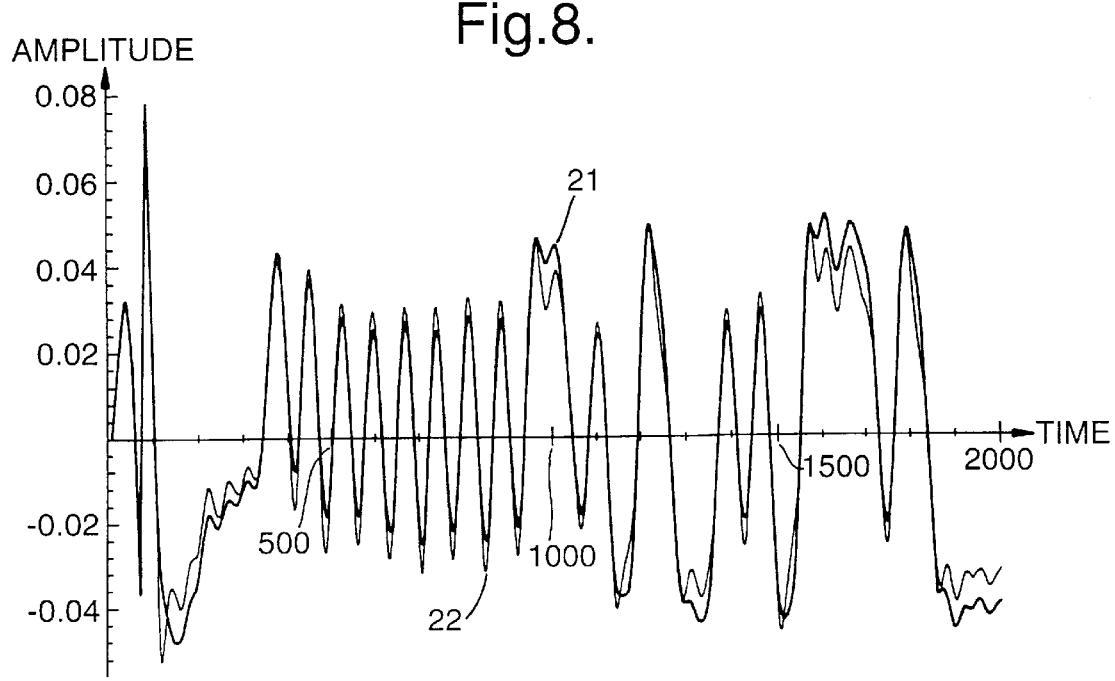

FIG. 8 illustrates the effect of the filter 9 on a pulse modulated signal. Signal 21 (indicated by a heavy line) is the pulse modulated signal at the input 11 to the filter. Signal 22 (indicated by a light line) is the pulse modulated signal at the output 19 of the filter. It can be seen that the amplitudes of the pulses have been to some extent equalised in the output signal and so the effect of ISI has been mitigated.

The decoder 10 may use techniques such as DFE (decision feedback equalisation) and Viterbi decoding to increase further the likelihood of correctly decoding the signal output from the postdetection filter.

In designing the filter 9, the precise characteristics of the filter are chosen with the aim of maximising the probability that the pulse modulated signal will be decoded correctly. To achieve this it may be necessary to balance the effects of more than one of the filter's characteristics. For instance, especially in a lower order filter, the effect of the filter's gain characteristics in reducing ISI may have to be balanced against distortion introduced by any non-linearity of the filter's phase response. A rough estimate of the required gain may be made by noting that (in a binary coded signal) equalising as far as possible the amplitudes of the pulses in the signal will go a long way to mitigating the effect of ISI. Therefore, a first approximation of the desired gain of the filter may be made by measuring the amplitudes of high and low amplitude pulses such as 15 and 17 in FIG. 5 and then taking the required gain of the filter to be $h_1/h_2$, where $h_1$ is the amplitude of pulse 15 and $h_2$ is the amplitude of pulse 17. (The pulses whose amplitudes are measured may be merely a simulation of the pulse modulated signal.) In fact, this relative gain is unlikely to equalise the amplitudes exactly because even pulses such as pulse 15 contain some components near half the pulse frequency. A more precise judgement of the preferred characteristics may therefore be made by an optimising process in which the characteristics of a given order of filter are varied, and the effect of this on the probability of a simulated pulse modulated signal being decoded correctly is monitored. In this process the ISI caused by any pulse may, in most cases, be considered to be limited to the three or four adjacent pulses on either side of that pulse. Typically the gain of the filter at half the pulse frequency will be between 1 dB and 5 dB greater than the gain at zero frequency. In FIG. 6 the figure is around 2 dB.

As well as reducing the effect of ISI the filter 9 also has the potential to reduce the effects of other sources of distortion of the signal. The strongest interfering signals due to co-channel interference are likely to be those in which pulses have constructively interfered with each other. Those are likely to be sections of consecutive pulses of the same sign which contain a relatively strong low frequency component and are therefore selectively filtered from the signal at 11 by the filter 9. The other filters in the receiver conventionally have increasing loss at increasing frequency, and therefore greater loss at half the pulse frequency than at lower frequencies. These filters can increase ISI but this effect can to some extent be reversed by the filter 9.

The filter 9 has been found to be most effective when it is located in the baseband section of the receiver and immediately before the decoder so that the decoder takes as input the signal output from the filter. However, this is not essential. The filter may be advantageous in the RF section of the receiver and even if there are components of the receiver between the filter and the decoder. In that case the decoder would take as input a signal generated in dependence on the signal output from the filter.

In view of the above description it will be clear to a person skilled in the art that various modifications may be made within the scope of the invention. The invention may include any novel features or combinations of features disclosed herein either explicitly or implicitly and any generalisations thereof irrespective of whether they relate to the invention as claimed or mitigate any of the problems addressed by the invention as claimed.

What we claim is:

1. A signal receiver for use in a radio telephone system, the signal receiver comprising a demodulator for demodulating a received signal to produce a pulse modulated signal, and a post-detector filter for receiving the pulse modulated signal and filtering the received pulse modulated signal to generate a second signal, the filter having a greater gain at half the pulse frequency of the pulse modulated signal than at a lower frequency, wherein pulses in a portion of the second signal comprised of consecutive pulses of alternating sign are enhanced relative to pulses in a portion of the second signal comprised of consecutive pulses of the same sign to aid in the equalization of the amplitude of the alternating and consecutive pulses.

2. A signal receiver according to claim 1, wherein the lower frequency is zero.

3. A signal receiver according to claim 2, wherein the gain of the filter is at least 1 dB greater at approximately half the pulse frequency than at zero frequency.

4. A signal receiver according to claim 1, wherein the filter has a greater gain at approximately half the pulse frequency than at any lower frequency.

5. A signal receiver according to claim 1, wherein the gain of the filter peaks at approximately half the pulse frequency.

6. A signal receiver according to claim 1, wherein the filter provides an absolute gain at approximately half the pulse frequency.

7. A signal receiver according to claim 1, wherein said filter operates to mitigate a degradation of the pulse modulated signal.

8. A signal receiver according to claim 1, further comprising a decoder for decoding a signal dependent on the second signal.

9. A signal receiver according to claim 1, wherein the filter is in a baseband section of the receiver.

* * * * *